(12) United States Patent
Kim

(10) Patent No.: US 10,330,169 B2
(45) Date of Patent: Jun. 25, 2019

(54) FREQUENCY SENSITIVE TYPE SHOCK ABSORBER

(71) Applicant: MANDO Corporation, Pyeongtaek-si, Gyeonggi-do (KR)

(72) Inventor: Nam Ho Kim, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/880,048

(22) Filed: Jan. 25, 2018

(65) Prior Publication Data

US 2018/0223940 A1    Aug. 9, 2018

(30) Foreign Application Priority Data

Feb. 6, 2017  (KR) .................. 10-2017-0016148

(51) Int. Cl.
*B60G 17/08*     (2006.01)
*F16F 9/348*     (2006.01)
*F16F 9/512*     (2006.01)

(52) U.S. Cl.
CPC ............ *F16F 9/3485* (2013.01); *B60G 17/08* (2013.01); *F16F 9/3482* (2013.01); *F16F 9/5126* (2013.01); *B60G 2400/91* (2013.01); *B60G 2500/112* (2013.01)

(58) Field of Classification Search
CPC .... F16F 9/512; F16F 9/34; F16F 9/182; F16F 9/185; F16F 9/5126; F16F 9/3482; F16F 9/3485; B60G 2400/91; B60G 2500/112; B60G 17/08

USPC .................................. 188/322.15, 275, 280
See application file for complete search history.

(56) References Cited

U.S. PATENT DOCUMENTS

| | | | |
|---|---|---|---|
| 2005/0056506 A1* | 3/2005 | Deferme | F16F 9/5126 188/322.15 |
| 2012/0312648 A1* | 12/2012 | Yu | F16F 9/5126 188/280 |
| 2014/0353097 A1* | 12/2014 | Kim | F16F 9/5126 188/313 |
| 2015/0152936 A1* | 6/2015 | Kim | F16F 9/3485 188/313 |
| 2016/0201752 A1* | 7/2016 | Kim | F16F 9/182 188/280 |
| 2017/0074345 A1* | 3/2017 | Forster | F16F 9/5126 |

FOREIGN PATENT DOCUMENTS

KR    10-2015-0065058 A    6/2015

\* cited by examiner

*Primary Examiner* — Bradley T King
*Assistant Examiner* — San M Aung
(74) *Attorney, Agent, or Firm* — Hauptman Ham, LLP

(57) ABSTRACT

The present disclosure relates to a frequency sensitive type shock absorber configured to generate a soft damping force using one dividing disk to change the damping force on the basis of a traveling speed of a vehicle and a state of a road surface, improve ride comfort and steering stability, and decrease a manufacturing cost.

6 Claims, 4 Drawing Sheets

FREQUENCY SENSITIVE TYPE SHOCK ABSORBER

CROSS-REFERENCE TO RELATED APPLICATION

This application claims priority to and the benefit of Korean Patent Application No. 10-2017-0016148, filed on Feb. 6, 2017, the disclosure of which is incorporated herein by reference in its entirety.

BACKGROUND

1. Field of the Invention

The present disclosure relates to a frequency sensitive type shock absorber, and more particularly, to a frequency sensitive type shock absorber in which degradation of component durability is prevented because an amount of deformation of a contact protrusion is decreased during a low frequency stroke by forming a multi stage contact structure at a portion coming into contact with a dividing disk during the low frequency stroke.

2. Discussion of Related Art

Generally, shock absorbers are used in vehicles to improve ride comfort by buffering impacts or vibrations which are applied to axles from road surfaces while the vehicles travel. Frequency sensitive type shock absorbers configured to operate on the basis of vibrations of the vehicles based on states of road surfaces and change damping forces according to a low or high operating speed are used as such shock absorbers.

In such a conventional frequency sensitive type shock absorber, a structure in which an auxiliary valve for generating a soft damping force during a high frequency stroke is installed is used.

Here, the conventional auxiliary valve includes a connecting flow path formed in a piston rod, a housing coupled to the piston rod below a piston valve and including a flow path therein, a spool vertically installed in the housing to be vertically moveable and configured to generate a soft damping force by being lifted and lowered to open and close the flow path, an elastic member for elastically supporting the spool, and the like.

However, the conventional frequency sensitive type shock absorber has risks in that a contact noise is generated due to an impact caused by the vertical movement of the spool and the like to open and close the flow path, and durability thereof is degraded due to the impact applied by the spool and an increase in deformation rate of adjacent components. In addition, since the number of components of the conventional frequency sensitive type shock absorber is large, and a structure thereof is complex and the large number of components acts as a factor that increases manufacturing cost.

A prior art related to the present disclosure is disclosed in Korean Laid-Open Patent No. 10-2015-0065058 (Jun. 12, 2015) "SHOCK ABSORBER WITH A FREQUENCY UNIT".

SUMMARY OF THE INVENTION

The present disclosure is directed to a frequency sensitive type shock absorber configured to generate a soft damping force using one dividing disk to change the damping force on the basis of a traveling speed of a vehicle and a state of a road surface, improve ride comfort and steering stability, and decrease a manufacturing cost.

In addition, the present disclosure is also directed to a frequency sensitive type shock absorber including a multi stage contact structure at a portion coming into contact with a dividing disk during a low frequency stroke to decrease an amount of deformation of a contact protrusion during the low frequency stroke and prevent degradation of component durability.

According to an aspect of the present disclosure, there is provided a frequency sensitive type shock absorber including a piston valve coupled to one end of a piston rod and configured to divide a cylinder filled with a fluid into a compression chamber and an extension chamber, a connecting flow path formed in the piston rod and including an upper end in communication with the extension chamber, and an auxiliary valve coupled to the piston valve, wherein the auxiliary valve includes, a housing coupled to a lower portion of the piston valve to connect the connecting flow path and an auxiliary chamber in the auxiliary valve and including an auxiliary flow path formed in a lower portion thereof and configured to vertically pass through the lower portion, an upper washer and a lower washer respectively disposed at an upper portion and a lower portion of the auxiliary chamber, and including through holes formed to vertically pass through the upper washer and the lower washer to be connected to the connecting flow path and the compression chamber and first contact protrusions formed in a ring shape at edges of the through holes to protrude from corresponding surfaces, an upper seal and a lower seal coupled to the corresponding surfaces of the upper washer and the lower washer, respectively, and including second contact protrusions formed in a ring shape around edges of the first contact protrusions to protrude more than the first contact protrusions, and a dividing disk disposed to be spaced apart from and interposed between the upper washer and the lower washer and including an orifice hole formed to vertically pass through the dividing disk such that a fluid introduced into the auxiliary chamber flows vertically during a high frequency stroke, and one surface of the dividing disk bent to come into contact with the first contact protrusion and the second contact protrusion sequentially to close the orifice hole during a low frequency stroke.

Here, the corresponding protruding surfaces of the first contact protrusions and the second contact protrusions may be horizontally formed and may form vertical steps having different heights.

In addition, first curved portions, which are convex in directions in which the first contact protrusions protrude, may be formed along inner and outer diameter side edge portions of the first contact protrusions In addition, second curved portions, which are convex in directions in which the second contact protrusions protrude, may be formed along inner and outer diameter side edge portions of the second contact protrusions.

In addition, support protrusions may be formed along edges of corresponding surfaces of the upper seal and the lower seal to protrude from the corresponding surfaces, the support protrusions may be spaced apart from the second contact protrusions, have a diameter greater than that of the second contact protrusions, and support an edge of the dividing disk from above and below, and the orifice hole may be interposed between the second contact protrusions and the support protrusions.

In addition, corresponding surfaces of the support protrusions may be formed to protrude more than the second contact protrusions such that the dividing disk is spaced apart from the second contact protrusions.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, an exemplary embodiment of the present disclosure will be described in detail with reference to the accompanying drawings.

Advantages and features of the present disclosure and methods of achieving the same should be clearly understood with reference to the accompanying drawings and the following detailed embodiments.

However, the present disclosure is not limited to the embodiments to be disclosed, and may be implemented in various different forms. The embodiments are provided in order to fully explain the present disclosure and fully explain the scope of the present disclosure to those skilled in the art. The scope of the present disclosure is defined by the appended claims.

In addition, in a description of the invention, when it is determined that related well-known technology and the like unnecessarily obscure the gist of the invention, detailed descriptions thereof will be omitted.

Figure 1:
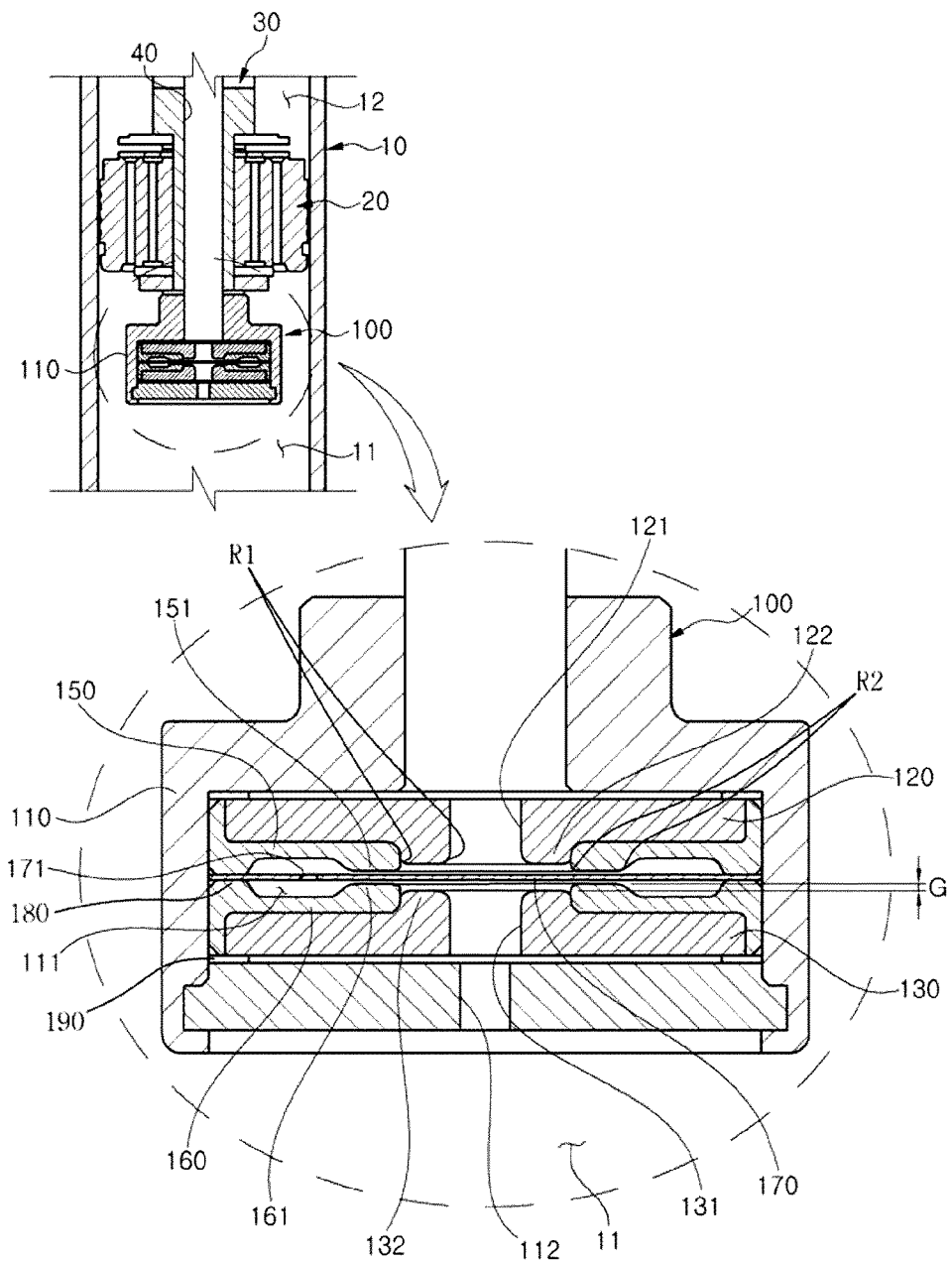
FIG. 1 is a front cross-sectional view illustrating a frequency sensitive type shock absorber according to the present disclosure.
Figure 2:
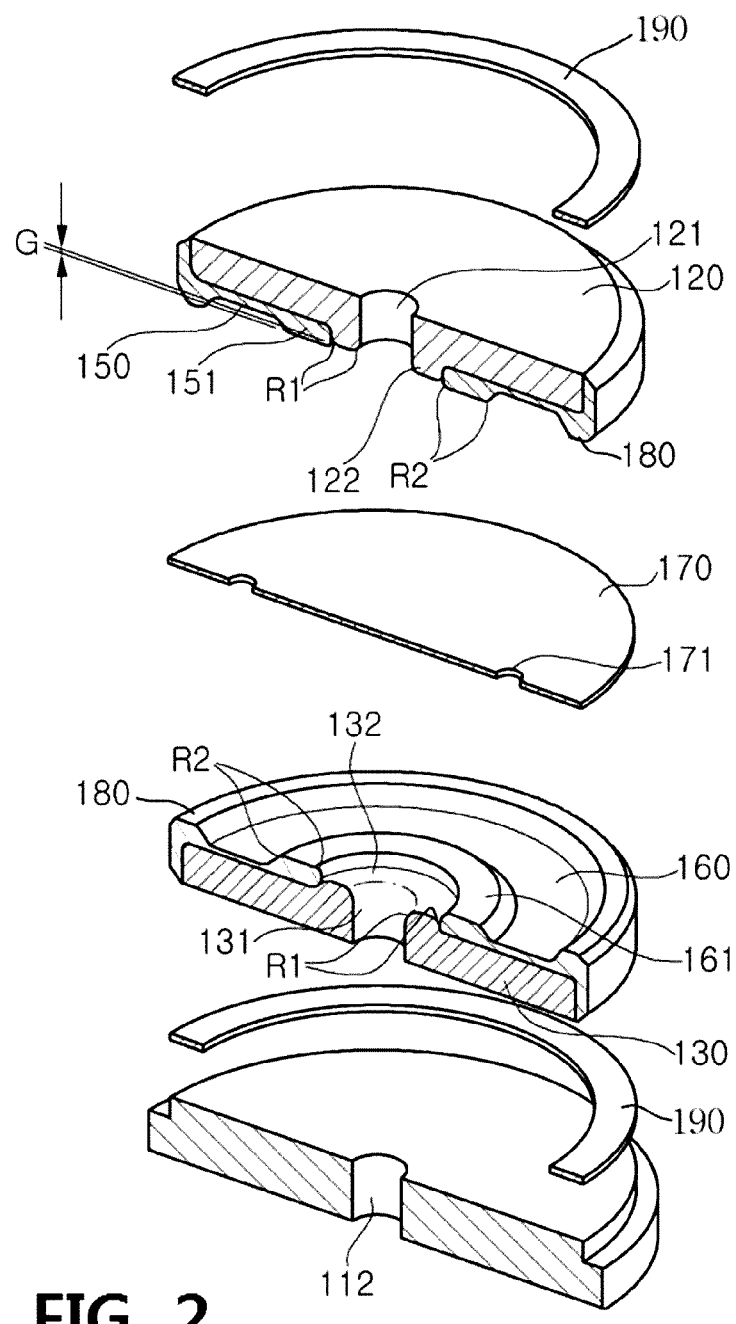
FIG. 2 is an exploded perspective view illustrating detailed components of the frequency sensitive type shock absorber according to the present disclosure.

FIG. 1 is a front cross-sectional view illustrating a frequency sensitive type shock absorber according to the present disclosure, and FIG. 2 is an exploded perspective view illustrating detailed components of the frequency sensitive type shock absorber according to the present disclosure.

Figure 3:
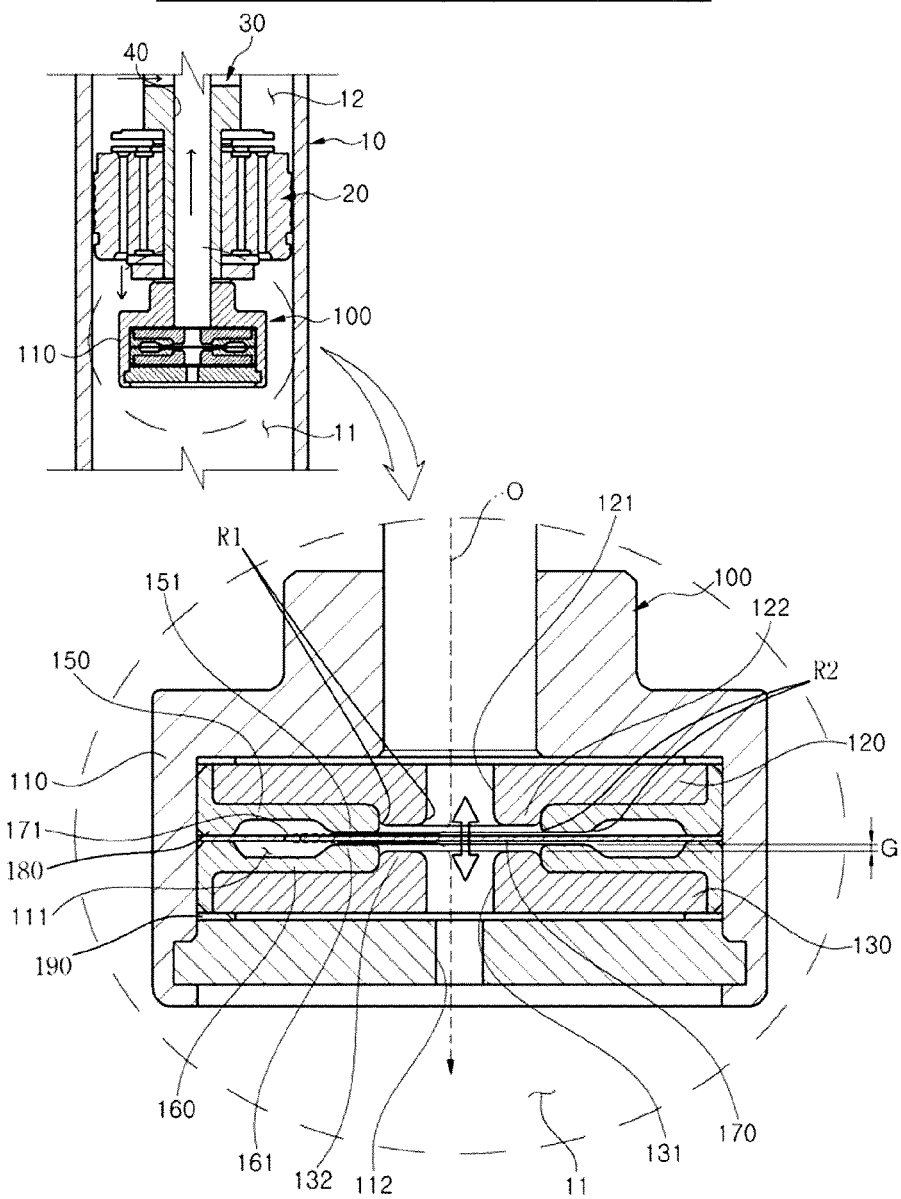
FIG. 3 is a view illustrating an operating state of the frequency sensitive type shock absorber according to the present disclosure during a high frequency extension stroke.
Figure 4:
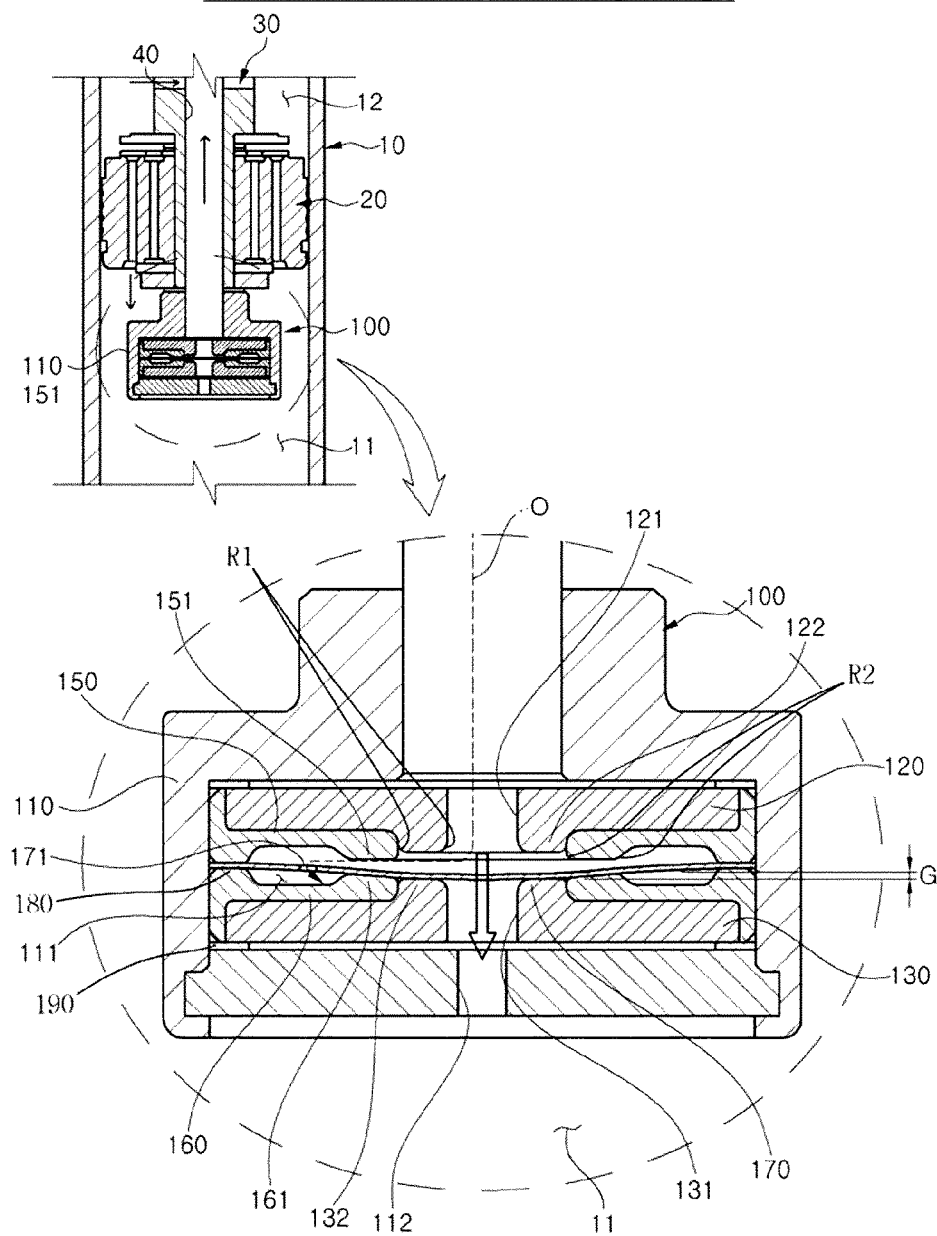
FIG. 4 is a view illustrating an operating state of the frequency sensitive type shock absorber according to the present disclosure during a low frequency extension stroke.

FIG. 3 is a view illustrating an operating state of the frequency sensitive type shock absorber according to the present disclosure during a high frequency extension stroke, and FIG. 4 is a view illustrating an operating state of the frequency sensitive type shock absorber according to the present disclosure during a low frequency extension stroke.

Referring to FIGS. 1 to 4, the frequency sensitive type shock absorber according to the present disclosure includes a cylinder 10, a piston valve 20, a piston rod 30, a connecting flow path 40, and an auxiliary valve 100.

Particularly, the auxiliary valve 100 includes a housing 110, an upper washer 120, a lower washer 130, an upper seal 150, a lower seal 160, and a dividing disk 170.

Among the above described components, the cylinder 10 may have a cylindrical shape in which a space is formed, and an inside of the cylinder 10 is filled with an acting fluid O (such as an oil).

Here, the inner space of the cylinder 10 is divided into a compression chamber 11 located at an lower portion thereof and an extension chamber 12 located at a upper portion thereof by the piston valve 20, which will be described below.

In addition, one end of the cylinder 10 and one end of the piston rod 30, which will be described below, perform compression and extension strokes in a state in which the one end of the cylinder 10 and the one end of the piston rod 30 are connected to a vehicle body or wheel side of a vehicle (not shown).

In addition, an additional coupling portion (not shown) for being connected to the vehicle body or wheel side may be installed at a lower end of the cylinder 10.

Meanwhile, although the cylinder 10 is illustrated as being a mono tube type cylinder including one tube, the cylinder 10 may be a twin tube type cylinder including two tubes.

For example, in a case in which the cylinder 10 is a twin tube type cylinder, the twin tube type cylinder may be divided into an inner tube in which a space is formed and an outer tube provided at the outside of the inner tube.

In addition, in the case in which the cylinder 10 is a twin tube type cylinder, storage chambers (not shown) may be further formed to be spaced apart from each other between the inner and outer tubes, and the storage chambers may be separated from the compression chamber 11 by a body valve (not shown).

That is, during the compression stroke, the fluid O in the compression chamber 11 may flow into the storage chamber via a lower flow path of the body valve, and, conversely, during the extension stroke, the fluid in the storage chamber may flow into the compression chamber 11 via the lower flow path of the body valve.

The piston valve 20 divides the inside of the cylinder 10 into the compression chamber 11 and the extension chamber 12, and the piston valve 20 generates a damping force caused by resistance of the fluid O while reciprocating in the cylinder 10.

For example, in a case in which the piston valve 20 performs the extension stroke, a pressure in the upper extension chamber 12 increases in comparison to the lower compression chamber 11, as illustrated in FIGS. 3 and 4.

Here, the fluid O with which the extension chamber 12 is filled pushes and opens a valve unit via a main flow path of the piston valve 20 and moves to the compression chamber 11.

Conversely, in a case in which the piston valve 20 performs the compression stroke, the fluid O, although not illustrated in the drawings, acts in a direction opposite a direction in which the fluid O acts during the above described process of the extension stroke.

One end of the piston rod 30 inserted into the cylinder 10 is coupled to the piston valve 20, and the other end of the cylinder 10 located at a side opposite the one end extends to the outside and is connected to the vehicle body or wheel side of the vehicle.

The connecting flow path 40 is vertically long in the piston rod 30, and the compression chamber 11 communicates with the extension chamber 12 via the connecting flow path 40 and the piston valve 20.

Here, an upper end of the connecting flow path 40 communicates with the extension chamber 12 and a lower end thereof located at a side opposite the upper end communicates with an auxiliary chamber 111, which will be described below.

In a case in which the piston valve 20 performs a low amplitude high frequency (which is higher than a reference frequency) stroke, the auxiliary valve 100 allows the fluid O in the compression chamber 11 and the extension chamber 12 to be bypassed to generate a soft damping force.

Here, the housing 110 is coupled to the piston valve 20, and a side surface of the housing 110 is spaced a predetermined distance from an inner circumferential surface of the cylinder 10.

In addition, the auxiliary chamber 111 is formed in the housing 110, and an upper end of the auxiliary chamber 111 communicates with the lower end of the connecting flow path 40.

In addition, an auxiliary flow path 112 is formed in a lower portion of the housing 110 to vertically pass through the lower portion such that the auxiliary chamber 111 communicates with the extension chamber 12.

The upper washer 120 is horizontally coupled to an upper portion of the auxiliary chamber 111, and the upper washer 120 may have a disk shape such that a side surface thereof is in close contact with an inner circumferential surface of the auxiliary chamber 111.

Here, a through hole 121 is formed in the upper washer 120 to vertically pass through the upper washer 120 such that the connecting flow path 40 is connected to the auxiliary chamber 111.

The through hole 121 of the upper washer 120 is collinear with a center of the upper washer 120, and the through hole 121 of the upper washer 120 is collinear with the connecting flow path 40.

In addition, a ring shaped first contact protrusion 122 is formed to protrude downward from a lower surface of the upper washer 120 along an edge of the through hole 121.

In addition, first curved portions R1, which are convex in directions in which the first contact protrusion protrudes, are formed along inner and outer diameter side edge portions of the first contact protrusions 122.

The first curved portions R1 of the first contact protrusion 122 formed along the inner and outer diameter side edge portions prevent the inner and outer side edge portions of first contact protrusion 122 from excessively protruding outward.

That is, in a case in which one surface of the dividing disk 170, which will be described below, is bent to come into contact with a first contact protrusion 122 formed on an upper surface of the upper washer 120, an amount of deformation of the first contact protrusions 122 may be decreased, and thus durability degradation of the upper washer 120 may be prevented.

In the case in which the piston valve 20 performs the high amplitude low frequency stroke, one surface of the dividing disk 170, which will be described below, is bent to come into contact with the first contact protrusion 122 of the upper washer 120.

The lower washer 130 is horizontally coupled to a lower portion of the auxiliary chamber 111 and is disposed in a shape corresponding to the upper washer 120.

Here, a through hole 131 is vertically formed in the lower washer 130 to pass through the lower washer 130 such that the auxiliary chamber 111 communicates with the above-described auxiliary flow path 112.

The through hole 131 of the lower washer 130 is collinear with a center of the lower washer 130 and the through hole 121 of the above-described upper washer 120.

In addition, a ring shaped first contact protrusion 132 is formed to protrude upward from the upper surface of the lower washer 130 along an edge of the through hole 131.

The first contact protrusion 132 formed on the upper surface of the lower washer 130 is formed to correspond to the first contact protrusion 122 formed on the lower surface of the above-described upper washer 120.

In addition, first curved portions R1, which are convex in the direction in which the first contact protrusion protrudes, are formed along the inner and outer diameter side edge portions of the first contact protrusions 132.

The first curved portions R1 of the first contact protrusion 132 formed along the inner and outer diameter side edge portions prevent the inner and outer side edge portions of first contact protrusion 132 from excessively protruding outward.

That is, in the case in which the one surface of the dividing disk 170, which will be described below, is bent to come into contact with the first contact protrusion 132 formed on the upper surface of the lower washer 130, an amount of deformation of the first contact protrusions 132 may be decreased, and thus durability degradation of the lower washer 130 may be prevented.

In the case in which the piston valve 20 performs the high amplitude low frequency stroke, as illustrated in FIG. 4, the one surface of the dividing disk 170, which will be described below, is bent to come into contact with the first contact protrusion 132 of the lower washer 130.

The upper seal 150 is coupled to the lower surface of the upper washer 120, and a second contact protrusion 151 is formed to protrude downward from a lower surface of the upper seal 150.

The second contact protrusion 151 of the upper seal 150 is formed in a ring shape along edges of the first contact protrusion 122 formed on the lower surface of the above-described upper washer 120.

Here, the second contact protrusion 151 of the upper seal 150 is in close contact with an outer circumferential surface of the first contact protrusion 122 having an inner circumferential surface formed on the lower surface of the upper washer 120.

Here, the second contact protrusion 151 of the upper seal 150 protrudes downward farther than the first contact protrusion 122 formed on the lower surface of the upper washer 120.

In addition, second curved portions R2, which are convex in a direction in which the second contact protrusion 151 protrudes, are formed along inner and outer diameter side edge portions of the second contact protrusion 151 formed on the lower surface of the upper seal 150.

The second curved portions R2 formed along the inner and outer diameter side edge portions of the second contact protrusion 151 prevent the inner and outer diameter side edge portions of the second contact protrusion 151 from excessively protrude outward.

That is, in a case in which the one surface of the dividing disk 170, which will be described below, is bent to come into contact with the second contact protrusion 151 formed on the lower surface of the upper seal 150, an amount of deformation of the second contact protrusion 151 may be decreased, and thus durability degradation of the upper seal 150 can be prevented.

During the high amplitude low frequency stroke, as illustrated in FIG. 4, the one surface of the dividing disk 170, which will be described below, is bent to come into contact with the second contact protrusion 151 of the upper seal 150.

Here, the second contact protrusion 151 of the upper seal 150 comes into contact with the one surface of the dividing disk 170, which will be described below, earlier than the first contact protrusion 122 of the upper washer 120.

A lower seal 160 is coupled to the upper surface of the lower washer 130, and a second contact protrusion 161 protrudes upward from an upper surface of the lower seal 160.

The second contact protrusion 161 of the lower seal 160 is formed in a ring shape along edges of the first contact protrusion 132 formed on the upper surface of the above-described lower washer 130.

Here, an inner circumferential surface of the second contact protrusion 161 of the lower seal 160 is in close contact with the outer circumferential surface of the first contact protrusion 132 formed on the upper surface of the lower washer 130.

In addition, the second contact protrusion 161 of the lower seal 160 is formed to protrude upward farther than the first contact protrusion 132 formed on the upper surface of the lower washer 130.

In addition, second curved portions R2, which are convex in a direction in which the second contact protrusion 161 protrudes, are formed along inner and outer diameter side edge portions of the second contact protrusion 161 formed on an upper surface of the lower seal 160.

The second curved portions R2 formed along the inner and outer diameter side edge portions of the second contact protrusion 161 prevent the inner and outer diameter side edge portions of the second contact protrusion 161 from excessively protrude outward.

That is, in a case in which the one surface of the dividing disk 170, which will be described below, is bent to come into contact with the second contact protrusion 161 formed on the lower surface of the lower seal 160, an amount of deformation of the second contact protrusion 161 may be decreased, and thus durability degradation of the lower seal 160 can be prevented.

In the case in which the piston valve 20 performs the high amplitude low frequency stroke, as illustrated in FIG. 4, the one surface of the dividing disk 170, which will be described below, is bent to come into contact with the second contact protrusion 161 of the lower seal 160.

Here, the second contact protrusion 161 of the lower seal 160 comes into contact with the one surface of the dividing disk 170, which will be described below, earlier than the first contact protrusion 132 of the lower washer 130.

In addition, corresponding protruding surfaces of the above-described first contact protrusions 122 and 132 and the second contact protrusions 151 and 161 are horizontally formed and form vertical steps G having different heights.

Here, the steps G between the first contact protrusions 122 and 132 and the second contact protrusions 151 and 161 may be variously set.

The steps G between the first contact protrusions 122 and 132 and the second contact protrusions 151 and 161 allow the one surface of the dividing disk 170, which will be described below, to come into contact with the first contact protrusions 122 and 132 and the second contact protrusions 151 and 161 sequentially.

The dividing disk 170 is spaced apart from and interposed between the upper washer 120 and the lower washer 130, and the dividing disk 170 may have a disk shape.

Here, a plurality of orifice holes 171 may be formed to vertically pass through the dividing disk 170 such that the fluid O vertically flows therethrough.

The plurality of orifice holes 171 may be formed as circular shaped holes and radially disposed about a vertical center line of the dividing disk 170.

In the case in which the piston valve 20 performs the high amplitude low frequency (which is lower than the reference frequency) stroke, the dividing disk 170 is bent and deformed in a direction opposite a direction of the stroke due to a pressure, as illustrated in FIG. 4.

Here, the dividing disk 170 is bent and deformed convexly in the direction opposite the stroke direction, and the one convex surface of the dividing disk 170 comes into contact with the above-described first contact protrusions 122 and 132 and the above-described second contact protrusions 151 and 161 sequentially to close the orifice holes 171.

In this case, since the orifice holes 171 are closed and the fluid O cannot flow, a hard damping force may be generated during the high amplitude low frequency (which is lower than the reference frequency) stroke.

Conversely, in the case of the low amplitude high frequency (which is higher than the reference frequency) stroke, the dividing disk 170 maintains a horizontal state, is spaced apart from the above-described first contact protrusions 122 and 132 and the above-described second contact protrusions 151 and 161, and opens the orifice holes 171, as illustrated in FIG. 3.

In this case, since the orifice holes 141 are opened and the fluid O can flow, a soft damping force may be generated during the low amplitude high frequency (which is higher than the reference frequency) stroke.

Meanwhile, support protrusions 180 are formed to protrude along edges of corresponding surfaces of the upper seal 150 and the lower seal 160.

The support protrusions 180 are spaced apart from the above-described second contact protrusions 151 and 161, have diameters greater than that of the above-described second contact protrusions 151 and 161, and support an edge of the dividing disk 170 from above and below.

Here, the orifice holes 171 are interposed between the second contact protrusions 151 and 161 and the support protrusions 180 to form a flow path through which the fluid O vertically flows in the auxiliary chamber 111.

Meanwhile, support rings 190 may be additionally disposed at an upper end edge portion of the upper washer 120 and a lower end edge portion of the lower washer 130.

The support rings 190 may have a ring shape in which a hollow is formed at a center thereof as illustrated in FIG. 2, and may be in close contact with and be inserted into the upper end edge portion of the upper washer 120 and the lower end edge portion of the lower washer 130.

Hereinafter, operation of the frequency sensitive type shock absorber according to the present disclosure will be described below with reference to FIGS. 3 and 4.

First, in the case of the low amplitude high frequency extension stroke, the fluid O in the extension chamber 12 is introduced into the connecting flow path 40 and the through hole 121 of the upper washer 120, as illustrated in FIG. 3.

Then, the fluid O introduced into the through hole 121 of the upper washer 120 flows into the compression chamber 11 via the orifice holes 171, the through hole 131 of the lower washer 130, and the auxiliary flow path 112.

Simultaneously, during a process in which the fluid O in the extension chamber 12 flows into the compression chamber 11 via the main flow path of the piston valve 20, a main damping force is generated.

In this case, since the fluid O is bypassed in a state in which the orifice holes 171 of the dividing disk 170 are vertically opened, a soft damping force may be generated.

Conversely, in a case of a high amplitude low frequency extension stroke, the fluid O in the extension chamber 12 is introduced into the connecting flow path 40 and the through hole 121 of the upper washer 120, as illustrated in FIG. 4.

Here, the dividing disk 170 is bent and deformed convexly due to a pressure in a direction opposite the direction of the stroke, and the one convex surface of the dividing disk 170 comes into contact with the first contact protrusions 122 and 132 and comes into contact with the second contact protrusions 151 and 161 sequentially to close the orifice holes 171.

In this state, since the orifice holes 171 are closed by the dividing disk 170, a hard damping force may be generated during the high amplitude low frequency (which is lower than the reference frequency) stroke.

As described above, the present disclosure can prevent degradation of component durability because an amount of deformation of the first contact protrusions 122 and 132 and the second contact protrusions 151 and 161 can be decreased during a low frequency stroke by forming the multi stage contact structure at a portion coming into contact with the dividing disk 170 during the low frequency stroke.

In addition, the present disclosure can improve ride comfort and steering stability and reduce a manufacturing cost because a damping force can be changed according to a vehicle speed and a state of a road surface by generating a soft damping force using one dividing disk.

Although the specific embodiment of the frequency sensitive type shock absorber of the present disclosure has been described, it should be clear that various modifications may be made thereto without departing the scope of the present disclosure.

Therefore, the scope of the present disclosure is defined not by the described embodiment but by the appended claims, and encompasses equivalents that fall within the scope of the appended claims.

That is, the above-described embodiments should be considered in a descriptive sense only and not for purposes of limitation. The scope of the present disclosure is defined not by the detailed description but by the appended claims, and encompasses all modifications and alterations derived from meanings and the scope and equivalents of the appended claims.

What is claimed is:

1. A frequency sensitive type shock absorber comprising:
   a piston valve coupled to one end of a piston rod and configured to divide a cylinder filled with a fluid into a compression chamber and an extension chamber;
   a connecting flow path formed in the piston rod and including an upper end in communication with the extension chamber; and
   an auxiliary valve coupled to the piston valve,
   wherein the auxiliary valve includes:
   a housing coupled to a lower portion of the piston valve to connect the connecting flow path and an auxiliary chamber in the auxiliary valve and including an auxiliary flow path formed in a lower portion thereof and configured to vertically pass through the lower portion;
   an upper washer and a lower washer respectively disposed at an upper portion and a lower portion of the auxiliary chamber and including through holes formed to vertically pass through the upper washer and the lower washer to be connected to the connecting flow path and the compression chamber, and first contact protrusions formed in a ring shape at edges of the through holes to protrude from corresponding surfaces;
   an upper seal and a lower seal coupled to the corresponding surfaces of the upper washer and the lower washer, respectively, and including second contact protrusions formed in a ring shape around edges of the first contact protrusions to protrude more than the first contact protrusions; and
   a dividing disk disposed to be spaced apart from and interposed between the upper washer and the lower washer and including an orifice hole formed to vertically pass through the dividing disk such that a fluid introduced into the auxiliary chamber flows vertically during a high frequency stroke, and one surface of the dividing disk bent to come into contact with the first contact protrusion and the second contact protrusion sequentially to close the orifice hole during a low frequency stroke.

2. The frequency sensitive type shock absorber of claim 1, wherein the corresponding protruding surfaces of the first contact protrusions and the second contact protrusions are horizontally formed and form vertical steps having different heights.

3. The frequency sensitive type shock absorber of claim 2, wherein first curved portions, which are convex in directions in which the first contact protrusions protrude, are formed along inner and outer diameter side edge portions of the first contact protrusions.

4. The frequency sensitive type shock absorber of claim 2, wherein second curved portions, which are convex in directions in which the second contact protrusions protrude, are formed along inner and outer diameter side edge portions of the second contact protrusions.

5. The frequency sensitive type shock absorber of claim 1, wherein:
   support protrusions are formed along edges of corresponding surfaces of the upper seal and the lower seal to protrude from the corresponding surfaces;
   the support protrusions are spaced apart from the second contact protrusions, have a diameter greater than that of the second contact protrusions, and support an edge of the dividing disk from above and below; and
   the orifice hole is interposed between the second contact protrusions and the support protrusions.

6. The frequency sensitive type shock absorber of claim 5, wherein corresponding surfaces of the support protrusions are formed to protrude more than the second contact protrusions such that the dividing disk is spaced apart from the second contact protrusions.

* * * * *